April 14, 1936.  R. SCHULTZ  2,037,272
VEHICLE WHEEL
Filed April 4, 1935
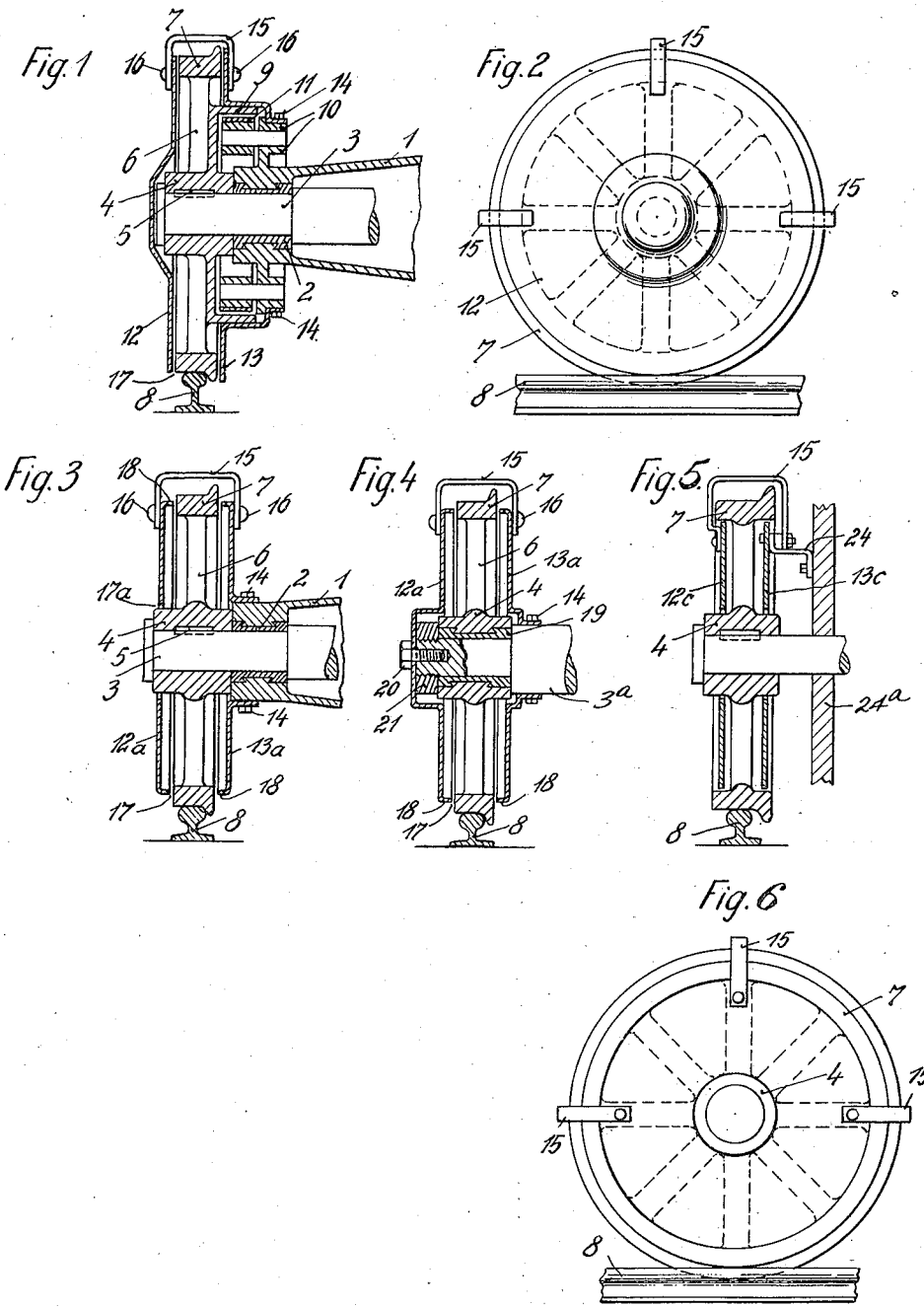
Inventor:
Reinhold Schultz
By Spear, Donaldson & Hall
Attys.

Patented Apr. 14, 1936

2,037,272

UNITED STATES PATENT OFFICE 2,037,272

VEHICLE WHEEL

Reinhold Schultz, Madrid, Spain

Application April 4, 1935, Serial No. 14,693
In Germany October 9, 1934

5 Claims. (Cl. 295—1)

This invention relates to vehicle wheels. The revolving wheel of a vehicle, by reason of its surface friction, and more particularly owing to the spokes, imparts a rotary motion to the air surrounding the wheel. In this manner, analogous to a fan-wheel, air is flung continuously outwards and is picked up by the head wind. The usual guard, such as a mudguard or other cover, which partially covers the wheel and has the object of avoiding a break in the peripheral form of the vehicle itself, is unable to prevent the air from being flung outwards and carried away by the head wind, as these guards are too spacious and do not envelop the wheel to a sufficient extent. The energy of rotation which is imparted to the air by the revolving wheel accordingly becomes lost, that is to say—there are caused at present at the wheels of a vehicle ventilation losses which, in the case of a high rate of travel, represent a considerable porportion of the head resistance.

According to the invention, this disadvantage is avoided by surrounding the wheel in close proximity with a cowl or casing adapted to the body of the wheel, in such fashion that the air surrounding the wheel and imprisoned in this casing is in practice unable to escape during the movement of the wheel, and the latter, therefore, is always enveloped by the same air. The air cannot be flung outwards owing to the narrowly fitting casing and owing to the particular embodiment of the walls of the casing, which form together with the wheel at their periphery a spacial seal, or also enclose the tire of the wheel. By reason of the closely fitting casing about the body of the wheel the air once set into rotation continues to move and rubs against the smooth faces of the casing, which possess an extremely small frictional resistance. Heretofore the position has been such that always fresh air was caused to rotate. As already stated, this lost energy of rotation forms a considerable portion of the head resistance. In the arrangement according to the invention merely a small fraction of this energy is lost owing to the friction against the smooth walls of the casing.

The casing may consist of two sheets of metal covering the body of the wheel on either side, the one sheet being secured to a stationary part of the vehicle, whilst the other sheet is held by the first sheet by means of a curved member bridging the body of the wheel. If the wheel revolves freely on the arbor, i. e., if the axle is stationary, the one sheet of the casing may be secured to the axle itself, whilst the other sheet is mounted on a permanent part of the vehicle, and if desired may be connected with the first sheet by means of a curved member bridging the wheel.

In an additional form of embodiment the casing may also be constructed in such fashion that it surrounds the wheel on either side and also about the periphery, and possesses an opening only at the bottom directed towards the ground, the length of which opening in the direction of travel of the vehicle is smaller than the diameter of the wheel.

The invention is illustrated by way of example in the accompanying drawing, in which Fig. 1 is a section through one form of embodiment of the wheel with the cowl or casing according to the invention, wherein the wheel is keyed on to the axle.

Fig. 2 is a side view of the wheel according to Fig. 1.

Fig. 3 is a section through a modified form of embodiment of a wheel.

Fig. 4 is a section through a further form of embodiment, in which the axle is arranged to be stationary and the wheel turns on the end of the axle.

Fig. 5 is a section through a still further form of embodiment, in which the casing is constituted by two disc-like members, which are arranged between the hub and the tire.

Fig. 6 is a side view of the embodiment according to Fig. 5.

Referring now to Figs. 1 and 2 of the drawing, 1 is the axle casing, in which there is located by means of the bearings 2 the rotary axle 3 having the wheel 4 secured thereto by means of a key or the like 5.

The wheel itself comprises the hub, the spokes 6 and the rim or tire 7. In the form of embodiment concerned it is assumed that the vehicle runs on rails 8. On the wheel there is located the brake drum 9, whilst on the axle casing 1 there is provided the support 10 for the brake lining 11. The parts above referred to are known per se.

According now to the invention, the wheel is surrounded by a cowl or casing. In the embodiment according to Figs. 1 and 2, this comprises the two side sheets 12 and 13 which, as shown in Fig. 1, are adapted closely to the form of the wheel. The sheet 13 is secured by screw 14 to the brake lining support, i. e., to a stationary part of the vehicle. The sheet 12 is connected with the sheet 13 by means of curved members 15. The curved members are secured to the two side sheets 12 and 13 by means of rivets 16, screws or the like. The two sheets 12 and 13 form with their outer marginal zones in relation to the rim or tire 7 crevice seals 17 which are intended to prevent the passage of air. Upon the rotation of the wheel merely the air enclosed within the casing is moved by the wheel. Whereas heretofore air has continuously been set into rotation and then flung outwards, the extremely small amount of air in the case of the invention is, once the same has been set into rotation, maintained in contact with the wheel, the same losing merely a fraction of the energy of rotation imparted thereto by friction against the very smooth walls of the casing. In this manner there are obtained the advantages above referred to.

In the form of embodiment according to Fig. 3 the two discs 12a and 13a forming the casing are constructed in dish-like form, in such fashion that the turned edges 18 of the discs extend closely up to the rim 7 and in this manner form seals. The member 13a is secured to the axle casing 1 by screws 14, and the member 12a is connected with the discs 13a by curved members 15. The edge of the disc 12a, which surrounds the hub, is also approached closely up to the hub, so that a seal 17a is formed likewise at this point.

In the form of embodiment according to Fig. 4 the wheel axle is stationary, and the wheel rotates about the arbor 3a. For this purpose, in the manner known per se, there is provided in the hub of the wheel a bearing 19. Broadly speaking, the form of the cowl or casing is similar to that in the embodiment according to Fig. 3. The two discs 12a and 13a are also furnished with a dish-like form, but in this case the disc 12a is secured to the fixed arbor by means of a screw 20 or the like. The disc 13a may also be secured to the arbor 3a or to any other stationary part of the vehicle by means of screws 14. Moreover the two discs 12a and 13a may be connected together by means of the curved members 15 aforesaid.

The seals are also produced as in the form of embodiment according to Fig. 3 by the edges of the two discs 12a and 13a, which edges are approached closely to the rim of the wheel. In the form of embodiment according to Fig. 4 the wheel is held by means of a disc 21, which is screwed on to the arbor.

In the form of embodiment according to Figs. 5 and 6 the casing comprises the two side sheets or discs 12c, 13c. These sheets are located between the outer cylindrical jacket of the hub and the inner cylindrical jacket or the rim or tire of the wheel. In this fashion a seal is formed between each edge of the discs and the hub or rim respectively. The spokes, which are the primary cause of the loss by friction, are also in this manner completely enclosed, so that the air imprisoned by the discs 12c, 13c must necessarily rotate together with the wheel. The attachment of the two discs 12c and 13c may take place in analagous fashion to the embodiments in Figs. 1–3, the two discs being connected together by curved members 15, and the disc 13c situated next to the vehicle being secured to the latter by angle pieces 24 or the like.

What I claim as new and desire to secure by Letters Patent is:

1. In combination with a vehicle wheel, a casing comprising circular cover sheets on either side of said wheel, said cover sheets being in close proximity to the sides of said wheel and having their outer peripheries in close substantially sealing relation to the rim of the wheel whereby the air between the sheets is practically unable to escape and remains in rotation with the wheel, and means connected to a stationary part of the vehicle for mounting the sheets in said position.

2. In combination with a vehicle wheel, a casing comprising annular cover sheets on either side of said wheel, said cover sheets being in close proximity to the sides of said wheel and having their outer peripheries in close substantially sealing relation to the rim of the wheel, the inner edge of at least one of said sheets being in close substantially sealing relation to the hub of the wheel, whereby the air between the sheets is practically unable to escape and remains in rotation with the wheel, and means connected to a stationary part of the vehicle for mounting the sheets in said position.

3. In combination with a vehicle wheel, a casing comprising circular cover sheets on either side of said wheel, said cover sheets being in close proximity to the sides of said wheel and having their outer peripheries in close substantially sealing relation to the rim of the wheel whereby the air between the sheets is practically unable to escape and remains in rotation with the wheel, one of said sheets being secured to a stationary part of the vehicle, and the second of said sheets being secured to the first sheet by spaced individual curved members bridging the periphery of said wheel.

4. In combination with a vehicle wheel, a casing comprising circular cover sheets on either side of said wheel, said cover sheets being in close proximity to the sides of said wheel and having their outer peripheries in close substantially sealing relation to the rim of the wheel whereby the air between the sheets is practically unable to escape and remains in rotation with the wheel, one of said sheets being secured to a stationary part of the vehicle, and the other sheet being secured at its center to the wheel arbor.

5. In combination with a spoked vehicle wheel, a casing comprising annular cover sheets on either side of the wheel, said cover sheets being in close proximity to the spokes and having their outer peripheries in close substantially sealing relation to the inner circumference of the rim of the wheel and having their inner edges in close substantially sealing relation to the outer circumference of the hub, and means connected to a stationary part of the vehicle for mounting the sheets in said position.

REINHOLD SCHULTZ.